United States Patent [19]

Duckstein

[11] 4,297,313

[45] Oct. 27, 1981

[54] METHOD FOR MANUFACTURING A PACIFIER

[76] Inventor: Stuart S. Duckstein, 111 Tall Oaks Dr., Wayne, N.J. 07470

[21] Appl. No.: 62,114

[22] Filed: Jul. 30, 1979

Related U.S. Application Data

[62] Division of Ser. No. 934,673, Aug. 18, 1978, Pat. No. 4,195,638.

[51] Int. Cl.³ .............................................. B29C 6/02
[52] U.S. Cl. .................................... 264/273; 264/275
[58] Field of Search ....................... 264/273, 247, 275; 128/360, 359

[56] References Cited

U.S. PATENT DOCUMENTS

| | | | |
|---|---|---|---|
| 2,335,872 | 12/1943 | Mitchell | 264/273 |
| 2,699,785 | 1/1955 | Allen | 128/360 |
| 2,821,764 | 2/1958 | Leahy et al. | 264/273 |
| 3,398,222 | 8/1968 | Kaufman, Jr. et al. | 264/273 |
| 3,923,067 | 12/1975 | Hurst | 128/360 |
| 3,967,832 | 7/1976 | Chambers | 264/273 |
| 4,132,232 | 1/1979 | Lerner | 128/360 |
| 4,143,452 | 3/1979 | Hakim | 264/275 |
| 4,195,638 | 4/1980 | Duckstein | 128/360 |

*Primary Examiner*—James B. Lowe
*Attorney, Agent, or Firm*—Morgan, Finnegan, Pine, Foley & Lee

[57] ABSTRACT

A pacifier having a rigid safety shield formed of non-resilient material integrally formed with a nipple and ring of soft conventional rubber-like pacifier material wherein the rigid shield is located in a molding cavity in the form of a pacifier, an interference member is axially disposed through the shield, nipple and the ring section of the cavity and thermosetting or thermoplastic material is injection molded into the cavity to rigidly retain the rigid shield member and form an integral pacifier.

2 Claims, 4 Drawing Figures

METHOD FOR MANUFACTURING A PACIFIER

This is a division of application Ser. No. 934,673 filed Aug. 18, 1978, now U.S. Pat. No. 4,195,638 issued Apr. 1, 1980.

FIELD OF THE INVENTION

This invention relates to devices for soothing discomfort which is experienced by babies during teething and to satisfy the sucking urge which occurs in babies. The invention relates specifically to the pacifier-type device. More particularly, the pacifier of this invention relates to the pacifier which is both comfortable to the baby and capable of conforming to government safety specifications. The invention also contemplates the method of producing a pacifier having a rigid safety shield held captive within the pacifier to prevent ingestion of the pacifier by a child.

BACKGROUND OF THE INVENTION

Description of the Prior Art

Baby soothers in general and pacifiers in particular have been in common use for many years. It is well known that pacifiers ideally provide the most comfortable surface possible against which a baby can chew to relieve the discomfort which attends teething and to accommodate the sucking desire of children.

As a result, pacifiers are typically made of both soft and hard rubber and any other material which combines resistivity and resiliency to provide a surface best suited to relieve the discomfort of teething and to satisfy the sucking urge of children.

It has also been recognized that means should be provided on the pacifier to prevent the child using the pacifier from swallowing the pacifier. Recently, government regulations have been propounded to require a pacifier structure sufficent to inhibit ingestion by the baby of the pacifier. The prior art contains soft material pacifiers with extremely enlarged shields to inhibit ingestion by the baby and rigid shields disposed intermediately between the teething member and the handle which will not deform and thereby prevent swallowing. Enlarged handles have also been provided to prevent a child from swallowing the pacifier. One of the most common current pacifier designs is comprised of a shield, principally of rigid plastic such as polypropylene contoured in both noncircular and circular configurations. The current pacifiers provided with these rigid shields suffer from the defect that they are two-piece or three-piece configurations; i.e., the shield is one piece, the handle another piece the nipple and a third piece which must be secured together.

Thus, the design of a multipiece assembled pacifier facilitates pacifier disassembly as a result of agressive use by the child. In the disassembled state one or all of the elements can be swallowed by the child.

SUMMARY OF THE INVENTION

It is an object of this invention to provide a pacifier which is essentially a one-piece integrally formed pacifier comprised of a ring section, a traditional rigid shield section and a nipple.

It is a further object of this invention to provide the integrally formed pacifier with a ring and nipple section formed of soft rubber-like or elastomeric material typically found in pacifiers.

The pacifier of the present invention is comprised of a rigid shield formed of a hard plastic material such as ABS or rigid polypropylene. The shield member is provided with an essentially centrally disposed circular recess having an array of small openings. The ring and nipple member are formed of an elastomeric flowable thermoplastic material such as polyvinyl chloride.

The pacifier is formed by molding or otherwise configuring a rigid insert with the centrally disposed shoulder and an array of holes, then locating the rigid shield in a mold and forming the ring and nipple by flowing the ring and nipple material through the holes in the recessed shoulder on the shield. Thus, an integrally formed pacifier is provided wherein the nipple and ring member material, by passage through the holes in the recessed shoulder, retain the rigid shield captive to form a one-piece unit.

DESCRIPTION OF THE PREFERRED EMBODIMENT

The pacifier of the present invention is capable of being formed in a variety of ways; however, the invention will be described in terms of forming the pacifier by injection molding.

Figure 1:
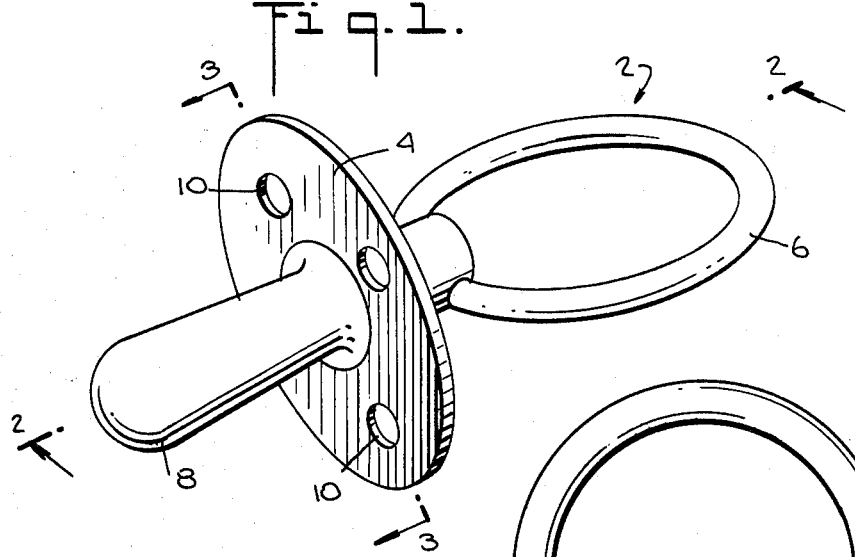
FIG. 1 is a perspective view of the pacifier of the invention.

The composite integrally formed pacifier 2 of the present invention, as best seen in FIG. 1, consists of a rigid shield 4, a ring section 6 and a nipple section 8. The shield member 4 is provided with ventilation holes 10 which are customarily found on pacifier shields.

The shield 4 of the present invention is also typically configured and can take any suitable shape. However, for illustrative purposes the shield 4 is shown as a circular shield of essentially 45 millimeters (1.75 inches) in diameter and of about a 0.1 inch thickness. The material used is preferably rigid polypropylene. Other materials which provide the smooth surface characteristics and sufficient rigidity and which will maintain dimentional integrity after boiling can also be used for the shield material.

Figure 2:
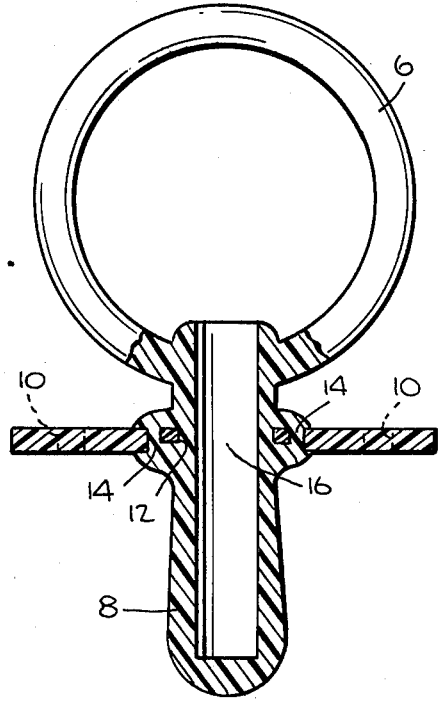
FIG. 2 is a sectional view of the shield taken through line 2—2 of FIG. 1.
Figure 3:
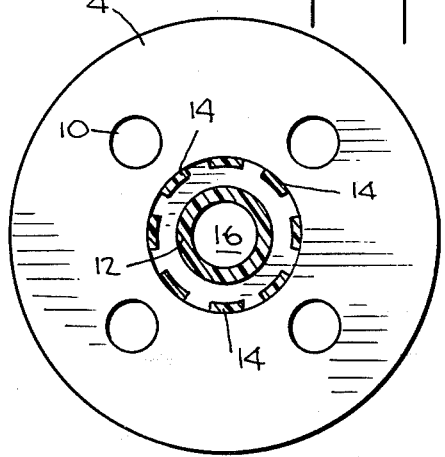
FIG. 3 is a sectional plan view of the shield taken through line 3—3 of FIG. 1.

As best seen in FIGS. 2 and 3, the shield member 4 is also provided with a centrally disposed shoulder or recess 12. An array or a plurality of holes 14 are located around the edge of the shoulder 12. A centrally disposed opening 16 is also provided to afford the maxiumum captivity of the shield 4 by the material of the handle 6 and nipple 8.

Figure 4:
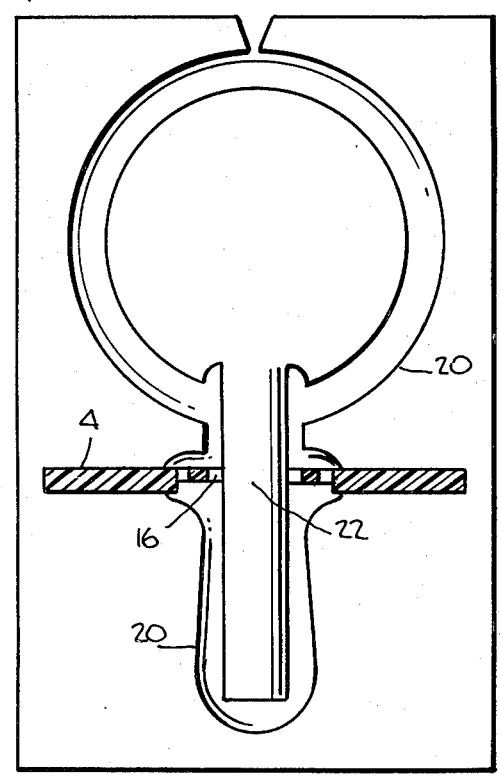
FIG. 4 is a sectional elevational view of the rigid shield member located in an injection mold cavity arranged for injection of the nipple and ring member to form the one piece pacifier of the present invention.

As best seen in FIG. 4, a cavity 20 for injection molding is shown with the shield 4 located intermediately. The remainder of the mold cavity is configured in the form of the ring and nipple member of the pacifier. An interference member 22 is located to direct the flow of the nipple and ring material adjacent the shoulder opening 16 in the insert. The nipple 8 and handle 6 are formed by flowing the nipple and handle material, typically elastomeric polyvinyl chloride, through the mold such that the material passes through the holes 14 in the shoulder 12 and in the opening 16 around the centrally disposed interference member 22 to capture the shield 4 thus providing an integrally formed one-piece pacifier 4.

It has been found that a shield 4 will provide the necessary rigidity and resiliency to inhibit a child from swallowing the pacifier if the shield 4 is sized in an outside diameter of approximately 45 to 46 millimeters. Practice has also taught that a shield 4 of rigid polypropylene of the present invention sized 45 millimeters (1.75 inches) of approximately 2.5 millimeter thickness will obtain the desired result and pass the requirements for pacifiers as reported in the Federal Register, Volume 42, No. 126, Thursday, June 30, 1977, Part 1511. The test requires that a pacifier will resist passing through an opening having a diameter of 42.7 millimeters (1.68 inches) when the pacifier 2 of this invention is urged through the opening at a force not exceeding two pounds (8.9 Newtons) within a period of five seconds and maintained at two pounds for an additional ten seconds. The test also includes "heat cycle deterioration" testing wherein the pacifier 2 is submerged in boiling water for five minutes, removed from the boiling water and cooled to room temperature (60° to 80° F.) for five minutes. After six cycles of the boiling/cooling procedure, the pacifier 2 is again urged through the 42.7 millimeter opening with a force attaining two pounds within five seconds and being maintained at two pounds for an additional ten seconds.

I claim:

1. A process for making a pacifier comprising the steps of:
   (a) forming a rigid shield having a centrally disposed hole and an array of holes concentrically arranged around the centrally disposed hole;
   (b) locating the rigid shield member in an injection molding cavity configured in the form of a pacifier which has a ring, nipple, and shield, said shield being located in a section of the cavity between the ring and nipple section with the holes in the shield arranged to provide communication between the ring and nipple sections of the cavity;
   (c) locating an interference member within the cavity spaced apart from the edge of the centrally disposed hole in the rigid shield and extending axially from the rigid shield through the ring section and into the nipple section; and
   (d) injecting material from the group comprising thermosetting and thermoplastic material into the cavity to fill the ring and nipple section and to pass through the holes of the shield to retain the shield captive.

2. A process as in claim 1 wherein the material injected into the cavity is a conventional elastomeric polyvinyl chloride.

* * * * *

UNITED STATES PATENT AND TRADEMARK OFFICE
CERTIFICATE OF CORRECTION

PATENT NO. : 4,297,313
DATED : October 27, 1981
INVENTOR(S) : Stuart S. Duckstein It is certified that error appears in the above-identified patent and that said Letters Patent are hereby corrected as shown below:

Col. 1, line 52: "the handle another piece the nipple and a third piece..." should read--the handle another piece and the nipple is a third piece--.

Signed and Sealed this

Twenty-third Day of February 1982

[SEAL]

Attest:

Attesting Officer

GERALD J. MOSSINGHOFF

Commissioner of Patents and Trademarks